United States Patent [19]

Yamamoto

[11] 4,302,788
[45] Nov. 24, 1981

[54] REVERSIBLE CASSETTE-TYPE RECORDING AND/OR REPRODUCING APPARATUS

[75] Inventor: Yoshinori Yamamoto, Tokyo, Japan
[73] Assignee: Sony Corporation, Tokyo, Japan
[21] Appl. No.: 37,106
[22] Filed: May 8, 1979

[30] Foreign Application Priority Data

May 8, 1978 [JP] Japan .............................. 53-61345[U]

[51] Int. Cl.³ ........................ G11B 15/02; G11B 5/55;
G11B 5/56; G11B 21/08
[52] U.S. Cl. .................................. 360/96.6; 360/106;
360/109; 360/137
[58] Field of Search ...................... 360/106, 137, 96.5,
360/96.6, 71, 78

[56] References Cited

U.S. PATENT DOCUMENTS

| | | | |
|---|---|---|---|
| 3,614,342 | 10/1971 | Siebert | 360/106 |
| 3,925,819 | 12/1975 | Bachmann | 360/106 |
| 4,017,900 | 4/1977 | Katsurayana | 360/137 |
| 4,138,701 | 2/1979 | Suzuki | 360/137 |

*Primary Examiner*—Robert S. Tupper
*Attorney, Agent, or Firm*—Lewis H. Eslinger; Alvin Sinderbrand

[57] ABSTRACT

In a reversible cassette-type tape recorder having a cassette holder movable from an operative position to a cassette ejecting position; an inverting mechanism for inverting movement of a magnetic head between a normal condition and a reverse condition, a drive mechanism for driving the inverting mechanism, a control slide movable between a first position and a second position by the drive mechanism; an ejecting slide displaceable from an inoperative position to an operative position for moving said holder to its ejecting position and being disposed substantially at right angles to the control slide; and cooperatively engageable stopper portions formed on the control slide and the ejecting slide, respectively. When the control slide is located at its first position, the ejecting slide can be moved to the operative position for causing the cassette holder to eject a cassette, and when the control slide is moved to the second position for inversion of the magnetic head, the ejecting slide is prevented from moving to its operative position by mutual engagement of the stopper portions.

5 Claims, 5 Drawing Figures

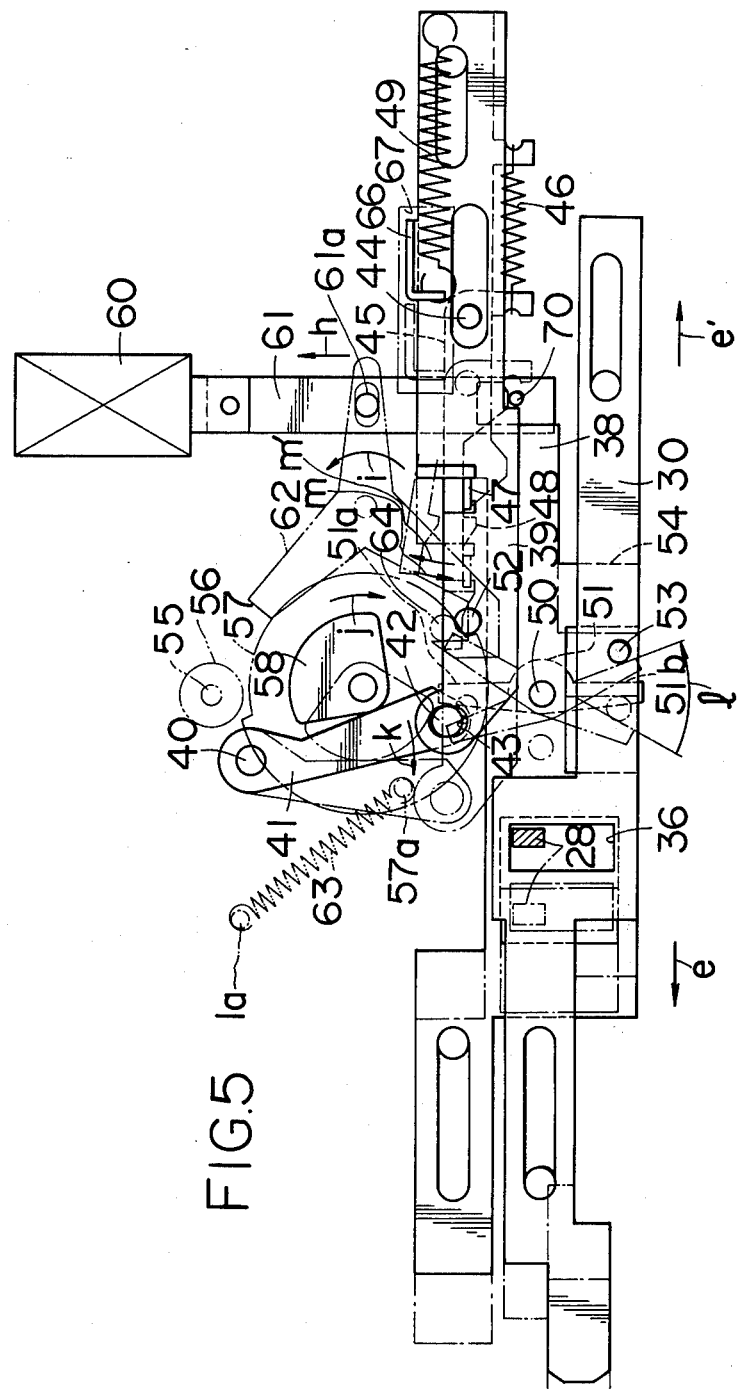

REVERSIBLE CASSETTE-TYPE RECORDING AND/OR REPRODUCING APPARATUS

BACKGROUND OF THE INVENTION

1. Field of the Invention

This invention relates to a reversible cassette-type recording and/or reproducing apparatus, and more particularly to a mechanism for preventing inadvertent cassette ejection in a reversible cassette-type recording and/or reproducing apparatus in which a magnetic head can be inverted or turned over for operation in a normal condition or a reverse condition.

2. Description of the Prior Art

A reversible cassette-type recording and/or reproducing apparatus includes a mechanism by which a magnetic head can be inverted for operation in a normal mode or a reverse mode. When the cassette cover or holder of such apparatus is opened during the inverting of the magnetic head or when the latter is positioned for operation in the reverse mode, there is the danger that the magnetic head may be damaged by contact with an extraneous body, for example, a pencil inserted out of mischief, thereby resulting in faulty operation of the apparatus.

OBJECTS AND SUMMARY OF THE INVENTION

Accordingly, it is an object of this invention to provide a reversible cassette-type recording and/or reproducing apparatus which eliminates the above-described danger.

Another object of this invention is to provide a reversible cassette-type recording and/or reproducing apparatus which is simple in construction and can surely prevent movement of the cassette holder or cover to its ejecting position while a magnetic head is being inverted or changed-over for the normal mode or reverse mode of operation.

A further object of this invention is to provide a reversible cassette-type recording and/or reproducing apparatus, as aforesaid, in which relatively few parts are required.

A still further object of this invention is to provide a reversible cassette-type recording and/or reproducing apparatus, as aforesaid, which can be simply assembled.

In accordance with an aspect of this invention, a reversible cassette-type recording and/or reproducing apparatus includes a cassette holder or cover; a magnetic head; an inverting mechanism for inverting the magnetic head for operation in either a normal condition or a reverse condition; a drive mechanism for driving the inverting mechanism; a control slide to be moved between a first position and a second position by the drive mechanism; an ejecting slide movable between an inoperative position and an operative position for displacing the cassette holder or cover to an ejecting position and being disposed substantially at right angles to the control slide; and cooperatively engageable stopper portions formed on the control slide and ejecting slide so that, when the control slide is located at its first position, the ejecting slide can be moved to the operative position for displacement of the cassette holder or cover to its ejecting position and, when the control slide is moved to the second position for inversion of the magnetic head, the ejecting slide is prevented from moving to its operative position by mutual engagement of the stopper portions.

The above, and other objects, advantages and features of the invention, will become readily apparent from the ensuing detailed description, which is to be read in connection with the accompanying drawings.

BRIEF DESCRIPTION OF THE DRAWINGS

FIG. 5 is a front view of a drive mechanism for driving the head inverting mechanism of FIG. 3 in the illustrated reversible cassette-type tape recorder according to this invention.

DESCRIPTION OF THE PREFERRED EMBODIMENTS

Figure 1:
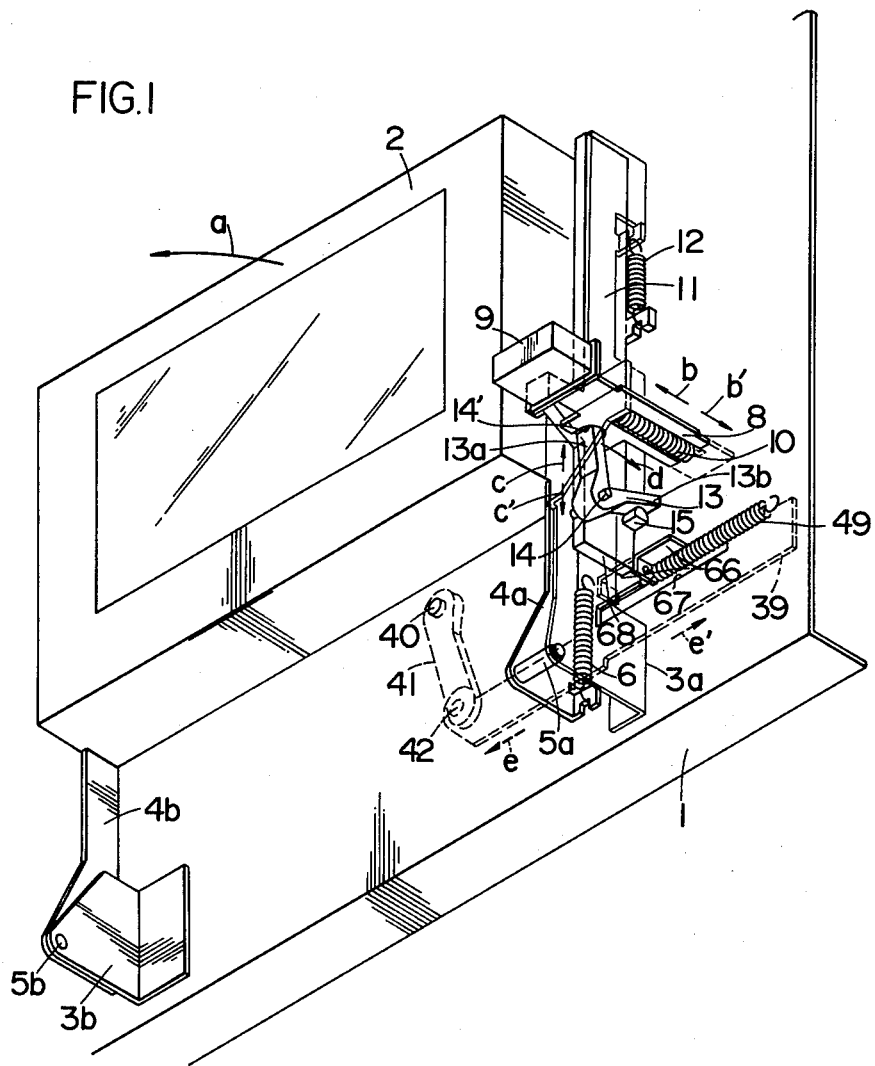
FIG. 1 is a perspective view of a cassette holder ejecting mechanism of a reversible cassette-type tape recorder according to one embodiment of this invention.

First, an ejection operating mechanism of a cassette-type tape recorder will be described with reference to FIG. 1 and FIG. 2 in which a cassette deck of the vertical type is shown with its chassis 1 being vertically arranged. A cassette holder or cover 2 is arranged in front of chassis 1 as to be pivotable relative to the latter. More particularly, a pair of support brackets 3a and 3b are fixed to the front surface of chassis 1, and opposite side walls 4a and 4b of cassette holder 2 project downward from the latter and having lower end portions pivoted to brackets 3a and 3b by pins 5a and 5b. The cassette holder 2 is urged to pivot in the ejecting direction indicated by arrow a on FIG. 1 by a restoring spring 6 extended between the lower end portion of one side wall 4a and a suitable anchor (not shown) on chassis 1.

The support bracket 3a is vertically elongated, and an ejecting slide 8 is supported on a part of support bracket 3a as to be slidable in the directions of the arrows b and b' which are normal to the plane of chassis 1. An ejecting push-button 9 is fixed to the front end of ejecting slide 8, and a restoring spring 10 extends between ejecting slide 8 and chassis 1 for urging the ejecting slide 8 forwardly, that is, in the direction of arrow b. An ejection operating slide 11 is suitably mounted so as to be slidable in the directions of arrows c and c', that is, vertically along support bracket 3a, and slide 11 is urged in the direction of arrow c by a restoring spring 12 which extends between ejection operating slide 11 and a lug on support bracket 3a. A substantially L-shaped transmitting lever 13 is pivoted on a pin 14 extending from bracket 3a below slide 8. One end 13a of transmitting lever 13 is engaged in a recess 14' formed in ejecting slide 8, and the other end 13b of the transmitting lever contacts, from above, a pin 15 projecting from ejection operating slide 11. An ejecting stopper 16 is fixed on ejection operating slide 11 at the side of the latter facing toward cassette holder 2. A roller 17 rotatably mounted on side wall 4a of cassette holder 2 is engageable with ejecting stopper 16. A limiting lug 18 is formed on a part of the supporting member 3a to be contacted by roller 17 for regulating or limiting the angular displacement of cassette holder 2 to its ejecting position.

With the above-described ejection operating mechanism, roller 17 is adapted to bear against a depending portion 16a of stopper 16 for locking cassette holder 2 at its operative position.

Figure 2:
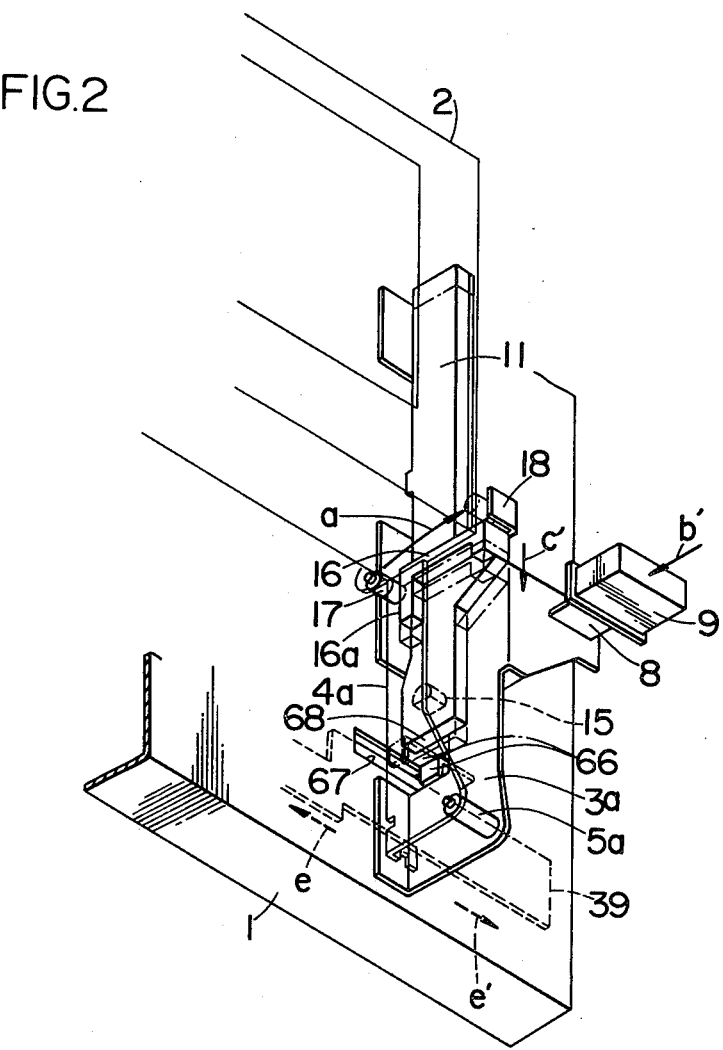
FIG. 2 is another perspective view of the cassette holder ejecting mechanism of FIG. 1.

When ejecting push-button 9 is pressed in the direction b' against the force of restoring spring 10, in the condition shown on FIG. 1, transmitting lever 13 is turned by ejecting slide 8 in the direction d and acts on pin 15 to displace ejecting slide 11 in the direction c' against the force of restoring spring 12 to the position represented by the dot-dash line on FIG. 2. As a result, stopper 16 is disengaged from roller 17, thereby permitting spring 6 to angularly displace cassette holder 2 in the direction a. Thus, cassette holder 2 is moved to its ejecting position.

Next, a head inverting mechanism will be described with reference to FIG. 3 and FIG. 4, in which a head carriage 20 shown by dot-dot-dash lines is shown to be supported in front of chassis 1 so as to be movable in the vertical direction. For convenience of illustration, head carriage or base plate 20 is shown in a horizontal plane on FIG. 3, but it will be appreciated that plate 20 actually extends parallel to its vertical direction of movement. A head mount 21 is fixed on the front of head chassis or base plate 20. A vertical shaft 22 is rotatably supported by head mount 21. A head support 23 is fixed to the upper end of shaft 22, and a magnetic head 24 is attached to head support 23. A pinion 25 is fixed to a lower end of shaft 22, and it is in meshing engagement with a sectorial drive gear 26 which is rotatably supported on a support axle 27 extending from head mount 21. A rotary arm 28 is formed integrally with drive gear 26, and projects backwards from axle 27 through openings 29 in the head carriage 20 and chassis 1. A changing slide 30 is disposed behind chassis 1 and slidable laterally relative to the latter to change over the recording and/or reproducing apparatus between a normal condition and a reverse condition in response to movements of slide 30 in the directions shown by arrows e and e'. The rotary arm 28 is inserted through an oblong opening 36 in changing slide 30 so as to be coupled with the latter. A rotary arm member 31 is fixed to the pinion 25, and a toggle spring 33 is extended between a projecting end of rotary arm member 31 and an anchor 32 fixed to the head carriage or base plate 20. A pair of azimuth adjusting screws 35a and 35b are adjustably supported by fork-shaped upper end portions of the head mount 21 which are positioned at opposite sides of the magnetic head 24. An arm 34 fixed to a part of the head support 23 extends radially in respect to the axis of shaft 22 and contacts selectively with ends of the azimuth adjusting screws 35a and 35b so that such screws can adjust the azimuth of the magnetic head 24 within an angle of about 180 degrees.

Figure 3:
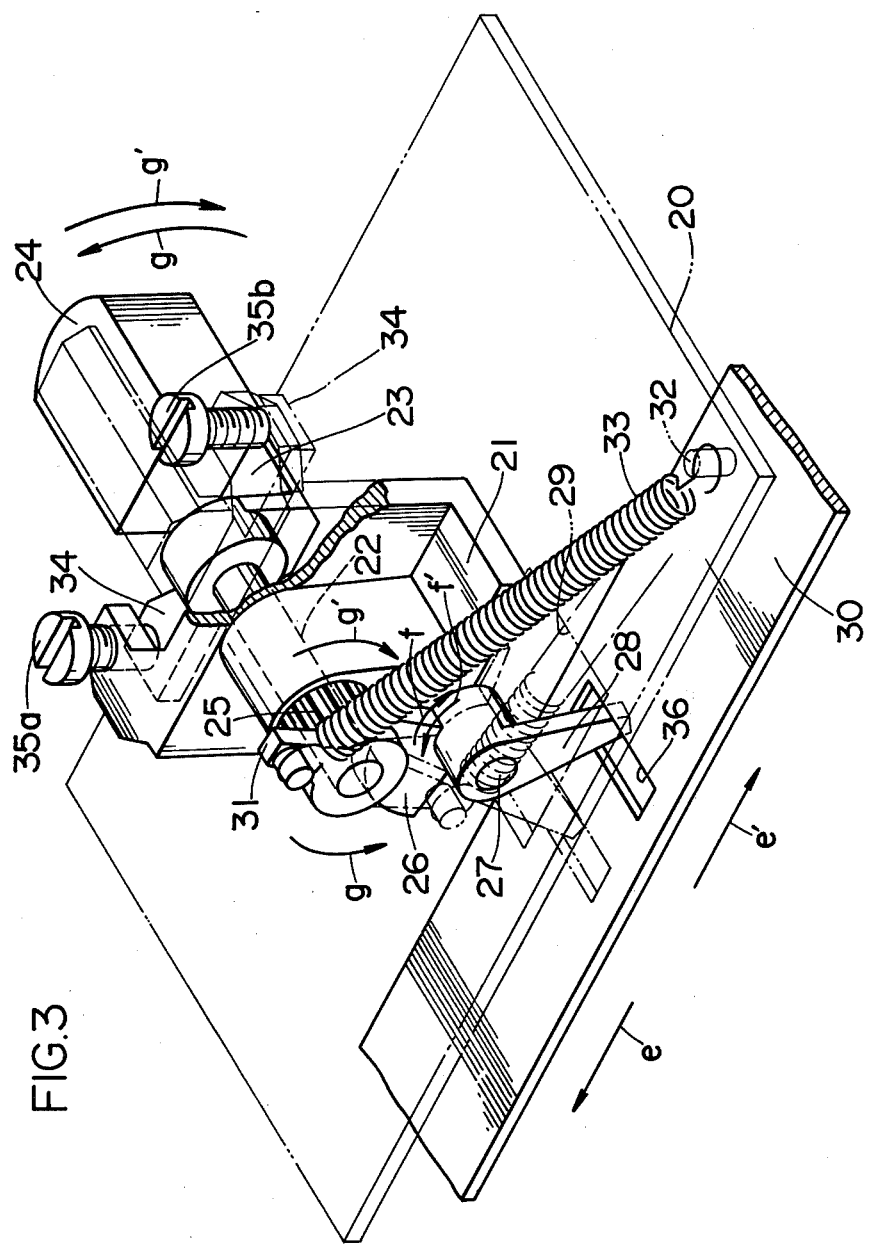
FIG. 3 is a perspective view of a head inverting mechanism of the reversible cassette-type tape recorder of FIGS. 1 and 2, and which is shown partly broken away.
Figure 4:
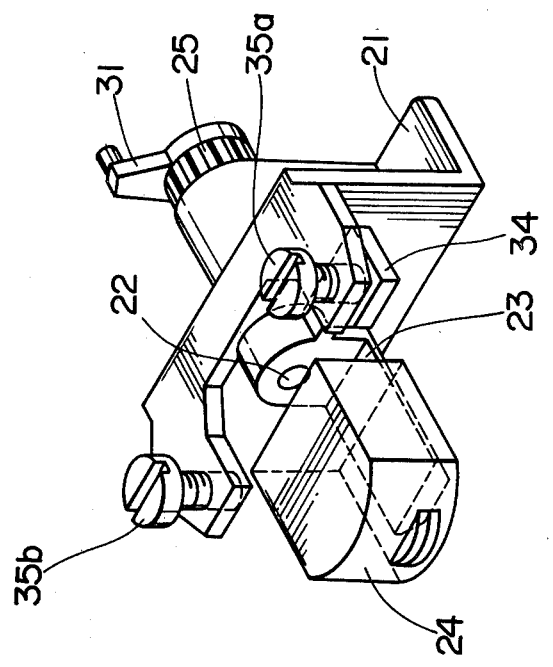
FIG. 4 is a perspective view of a part of the head inverting mechanism of FIG. 3.

With the above-described head inverting mechanism, the magnetic head 24 is put in the position shown by the solid lines on FIGS. 3 and 4 for the normal condition. In such normal condition, rotary arm 34 is urged against azimuth adjusting screw 35a by the spring action of toggle spring 33.

When changing slide 30 is slidably displaced in the direction e starting from the normal condition, rotary arm 28 is pushed by one edge of the oblong opening 36, and sectorial drive gear 26 is turned in the direction f to rotate pinion 25 in the direction g. Accordingly, magnetic head 24 is turned in the direction g by way of shaft 22 and head support 23. When magnetic head 24 has been rotated through about 90 degrees from the position shown in full lines, the toggle spring 33 automatically further rotates arm member 31 in the direction g. As a result, head support 23 is rotated through substantially 180 degrees into the position shown by dot-dash lines on FIG. 3, and rotary arm 34 comes into contact with the other azimuth adjusting screw 35b. Thus, the inversion operation for establishing the reverse condition is completed.

When the azimuth angle for the magnetic head 24 is determined both in the normal condition and in the reverse condition, the rotary arm 28 is freely positioned in the openings 29 and 36 so as to be out of contact with head carriage 20 and changing slide 30. Accordingly, rotary arm 28 has no influence on the azimuth of the magnetic head 24 or on the usual upward and downward movement of the head carriage 20 between its operative and inoperative positions.

When changing slide 30 is slidably displaced in the direction of the arrow e', the apparatus is changed over from the reverse condition into the normal condition, that is, magnetic head 24 is rotatably returned in the direction of the arrow g' back to its original position shown in full lines.

Next, a drive mechanism for driving the above-described head inverting mechanism will be described with reference to FIG. 5, in which a reverse slide 38 is shown to be arranged behind the chassis 1, in overlapping relation to the changing slide 30, and also mounted to be slidable in the directions e and e'. A control slide 39 is also arranged behind the chassis 1 in overlapping relation to the reverse slide 38, and is also designed to be slidable in the directions e and e'. A drive link or lever 41 is disposed behind chassis 1 and is pivoted, at its upper end, on a support pin 40. A pin 42 is fixed to the lower end of drive link 41, and is fitted into an oblong opening 43 in a top edge of control slide 39. Thus, drive link 41 and control slide 39 are connected with each other. A selection lever 45 is pivotally supported, at one end, on a pin 44 fixed to the front surface of reverse slide 38, and lever 45 is urged in the direction of arrow m, by a restoring spring 46 which is extended between projections on the selection slide 45 and reverse slide 38, respectively, so that selection slide 45 is urged downwardly toward an abutment 47 formed on control slide 39. A hook portion 48 is formed on the free end portion of the selection lever 45 and defines a downwardly opening notch or keeper which is engageable with abutment 47 on control slide 39 for movement with the latter. The slide 39 is shown to be urged in the direction e' by a restoring spring 49 which is extended between control slide 39 and a suitable anchor on chassis 1. Accordingly, when lever 45 urges abutment 47, reverse lever 38 is also urged in the direction e' by the force of spring 49. A normal set lever 51 is rotatably supported, at its center, on a pin 50 fixed on reverse slide 38. The opposite end portions 51a and 51b of normal set lever 51 are engageable with action pins 52 and 53 fixed on control slide 39 and changing slide 30, respectively. The action pin 53 is also designed to be engaged with a projection 54 depending from the lower edge of reverse slide 38.

The drive link 41 is engaged by a rotary cam 58 fixed relative to a coaxial partially-toothless gear 57. A drive gear 56 is fixed concentrically on a capstan 55 and is arranged near gear 57 as to be engageable with the toothed peripheral portion thereof. When drive gear 56 engages the toothed portion of gear 57, the rotational torque of capstan 55 driven by an electric motor is transmitted to gear 57, and drive link 41 is displaced angularly by rotary cam 58 from the position shown in solid lines to the position shown in dot-dash lines.

Further, there is provided an electro-magnetic plunger or solenoid 60 for system control. An operating slide 61 is connected to the armature of solenoid 60, and a pin 70 is fixed on a lower end portion of operating slide 61 so as to be engageable from below with a downwardly enlarged portion of selection lever 45. A trigger lever 62 for gear 57 is engaged with a pin 61a fixed on a central portion of operating slide 61, and functions to lock gear 57 in the illustrated position where a toothless portion of the gear 57 faces drive gear 56. When solenoid 60 is energized, lever 62 is rocked to release gear 57 from its locked condition. A trigger spring 63 is extended between a pin 57a fixed at an eccentric position on gear 57 and a pin 1a fixed on the chassis 1, and urges gear 57 to turn in from its locked position in the direction shown by the arrow j. The stop position of gear 57 is established by cooperative engagement of a pin 64 fixed on gear 57 with a hooked end on trigger lever 62.

In FIG. 5, the several components are shown in full lines in the positions they occupy when tape recorder is in the stop mode and the normal condition.

The change-over operation from the normal condition shown in FIG. 5 into the reverse condition will now be described.

First, solenoid 60 is suitably energized for a short time to retract its armature and thereby cause operating slide 61 to be instantaneously displaced in the direction shown by the arrow h. The trigger lever 62 is correspondingly rocked in the direction of an arrow i so that pin 64 is released from the hook portion of trigger lever 62. Thus, gear 57 is freed to be slightly rotated in the direction j by the action of trigger spring 63, so that the toothed portion of gear 57 comes into meshing engagement with drive gear 56. The rotational torque of capstan 55 is transmitted through gear 57 to rotary cam 58 to rotate the latter in the direction j and thereby cause the drive link 41 to be swung in the direction k.

In response to such swinging of the drive link 41, control slide 39 is slidably displaced in the direction e against the force of spring 49, and reverse slide 38 is similarly displaced in the direction e by engagement of the hook portion 48 of selection lever 45 with abutment 47 on the control slide 39. The projection 54 of reverse slide 38 comes into contact with pin 53 on changing slide 30 so that the latter is also slidably displaced in the direction e. The displacement of changing slide 30 in the direction e is transmitted to arm 28 for turning drive gear 26 so that the magnetic head 24 is inverted to the position for establishing the reverse condition, as previously described.

After the reverse condition is established, solenoid 60 is again energized to turn trigger lever 62 in the direction i, and the energized condition of the solenoid is maintained for holding trigger lever 62 in its rotated or turned position. Thus, the partly toothed gear 57 is locked with the pin 64 being held against the upper end portion of the trigger lever 62 and with the gear 57 being disengaged from the drive gear 56. When pin 64 bears against the upper end of trigger lever 62, the line from spring anchor 1a to pin 57a extends just below the axis of gear 57 so that the force of spring 63 again urges gear 57 in the direction j. When pin 64 on gear 57 engages the upper end of lever 62, rotary cam 58 on gear 57 is located at the operative position shown by dot-dash lines to maintain drive link 41 at its operative position also shown by dot-dash lines. Accordingly, the control slide 39 is locked in its operative position shown by the dot-dash lines.

When a stop push-button (not shown) is depressed with the tape recorder in the above-described reverse condition, solenoid 60 is deenergized to move slide 61 and the pin 61a thereon downwardly. Thus, trigger lever 62 is rocked clockwise, as viewed on FIG. 5 and pin 64 is released from lever 62 to permit gear 57 and rotary cam 58 to be instantaneously rotated to their original angular positions in the direction j by the force of trigger spring 63. Accordingly, drive link 41, the control slide 39 and the reverse slide 38 are moved back to the original positions for the stop mode as shown by the solid lines.

When reverse slide 38 is moved back to its original position, projection 54 thereon is separated from pin 53 on the changing slide 30. Accordingly, slide 30 does not accompany the backward movement of reverse slide 38, but rather remains in its displaced position shown by the dot-dash lines. Since the normal set lever 51 is carried by pin 50 on reverse slide 38, lever 51 is pushed, at its lower end 51b by pin 53 on changing slide 30, so as to be turned in the clockwise direction to the angular position shown by the dot-dot-dash lines (FIG. 5), when reverse slide 38 is moved back to its original position.

Next, there will be described the changing over from the reverse condition to the normal condition with the tape recorder in its stop mode.

The electro-magnetic solenoid 60 is energized, and the energization is maintained so that operating slide 61 is attached in the direction h to rock trigger lever 62 in the direction i. The pin 64 on gear 57 is released from locking by the hooked lower end of lever 62 and spring 63 moves gear 57 into meshing engagement with the drive gear 56. The gear 57 and rotary cam 58 are rotated in the direction j in the same manner as above described. The drive link 41 is swung in the direction k, to slide the control slide 39 in the direction e. However, at this time, selection lever 45 is pushed upwardly by the pin 70 fixed on operating slide 61, and so lever 45 is tilted in the position shown by the dot-dash lines in the direction m' against the force of restoring spring 46. Accordingly, although control slide 39 is slidably displaced in the direction e, the hook portion 48 of selection lever 45 is not engaged by abutment 47 on control slide 39, and reverse slide 38 remains in its original position.

When control slide 39 is slidably displaced in the direction e, pin 52 on control slide 39 pushes the upper end 51a of normal set lever 51 to turn the latter in the direction l about support pin 50. Such turning of normal set lever 51 causes the lower end 51b to push the pin 53 of changing slide 30 in the direction e'. Accordingly, changing slide 30 is moved in the direction e' and magnetic head 24 is inverted back to the normal condition.

In the above-described normal condition, control slide 39 is maintained at its operative position indicated by the broken or chain lines, in the same manner as in the reverse condition. When the stop push-button (not shown) is depressed, the apparatus is returned to its original or initial stop mode in the normal condition.

Next, there will be described an ejection-preventing mechanism for the cassette holder 2 with reference to FIGS. 1, 2 and 5.

The ejection-preventing mechanism functions to prevent the cassette holder 2 from being moved to its cassette ejecting position whenever the apparatus is in its recording mode, reproducing mode, fast-forwarding mode or rewind mode. Moreover, the ejection-preventing mechanism functions to prevent the cassette holder 2 from being moved in its ejecting position during inverting movements of the magnetic head between its normal condition and its reverse condition.

The ejection-preventing mechanism in the illustrated embodiment includes first and second operating members constituted by the ejecting slide 11 and the control slide 39, and which are disposed substantially at right angles to each other. The cassette holder 2 represents one example of a cassette cover that can be associated with an ejection preventing mechanism according to this invention. A stop portion 66 is formed on the upper edge of control slide 39, and projects forward therefrom through an opening 67 in chassis 1. Further, stop portion 66 is positioned on control slide 39 so as to be movable under a lower end 68 of ejecting slide 11 (FIGS. 1 and 2).

As previously described, control slide 39 is located in its backward position in the direction e', that is, in the full-line position on FIG. 5, so long as the tape recorder is in its stop mode with the head 24 in the normal condition or reverse condition. With control slide 39 in such backward position, the stopper portion 66, as shown by the solid lines on FIG. 5, is shifted from under the lower end 68 of ejecting slide 11. Thus, if the ejecting push-button 9 is depressed with the recorder in the above-described stop mode, ejecting slide 11 is free to slide in the direction c' on FIGS. 1 and 2, and the cassette holder 2 can be moved to its ejecting position without hindrance.

However, upon initiation of the inversion of magnetic head 24, control slide 39 is made to slide, as already described, in the direction e. Accordingly, the stopper portion 66 is moved in the direction e, and positioned directly under the lower end 68 of ejecting slide 11, as shown in broken lines on FIGS. 1 and 2. Therefore, if the ejecting push-button 9 is pushed during the inversion of the magnetic head 24 in an attempt to cause movement of ejecting slide 11 in the direction c', the lower end 68 of ejecting slide 11 contacts with the stopper portion 66 at substantially right angles. Thus, ejecting slide 11 is prevented from moving in the direction c', that is, ejecting push-button 9 cannot be depressed, and cassette holder 2 is prevented from being moved to its ejecting position.

After inversion of the magnetic head 24, control slide 39 is maintained in its forward position and, accordingly, cassette holder 2 is prevented from being moved to its ejecting position in the recording mode, reproducing mode, fast forwarding mode or rewind mode with the head in either its normal condition or its reverse condition. It is only when the control slide 39 is moved back to its original position in response to selection of the stop mode that cassette holder 2 can be moved to its ejecting position.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope or spirit of the invention as defined in the appended claims.

For example, in the described embodiment of an ejection-preventing mechanism, the stopper portion 66 is formed on control slide 39 (the second operating member) and engageable with the ejecting slide 11 (the first operating member). However, such stopper portion could be formed on the ejecting slide 11 (the first operating member), rather than on the control slide 39, and be engageable with the latter. In that case, the same function and effect can be achieved as in the embodiment which is illustrated.

Further, in the illustrated embodiment, the stopper portion 66 projects laterally from an edge of control slide 39. However, it may in any other form, for example, in place of stopper portion 66 engageable by the lower end 68 of the ejecting slide 11 to stop the downward movement of the latter in a particular position of slide 39, the same effect could be achieved by a pin (not shown) extending from slide 39 and engaging in an L-shaped slot in slide 11.

Further, in the illustrated embodiment, the control slide 39 (the second operating member) and the ejecting slide 11 (the first operating member) are moved rectilinearly backward and forward. However, one or both of such first and second operating members could be so designed to rotate or move in an arcuate path without altering its cooperation with the other operating member.

What is claimed is:

1. A reversible cassette-type recording and/or reproducing apparatus comprising:
    cassette covering means movable between an operative position and an ejecting position;
    magnetic head means;
    inverting means for effecting inverting movement of said head means between a normal condition and a reverse condition;
    drive means for driving said inverting means;
    a first operation member movable in a first direction from an inoperative position to an operative position for effecting movement of said cassette covering means to said ejecting position;
    a second operating member movable by said drive means between a first position, corresponding to the normal condition of said head means, and a second position, corresponding to the reverse condition of said head means, in a second direction substantially at a right angle to said first direction; and
    cooperatively engageable stopper means on said first and second operating members, respectively, for permitting movement of said first operating member from said inoperative to said operative position when said second operating member is located at said first position, and for preventing said movement of the first operating member to said operative position by mutual engagement of said stopper means when said second operating member is moved to said second position by said drive means in causing an inverting movement of said head means;
    said drive means including a drive link coupled to said second operating member for moving the latter, a rotary cam in contact with said drive link to urge the latter to move said second operating member, a partly-toothed gear having a toothed portion and a toothless position on its circumference and coupled to rotate with said rotary cam, a drive gear selectively engageable with the toothed portion of said partly toothed gear, a rotatable member for rotating said drive gear, and selectively actuable trigger means for contacting said drive gear with the toothed portion of said partly toothed gear so that, in response to actuation of said trigger means, said second operating member is moved between its first and second position.

2. A reversible cassette-type recording and/or reproducing apparatus according to claim 1; in which said trigger means includes a trigger member for defining first and second angular stop positions of said partly-toothed gear corresponding to the first and second positions of said second operating member, electromagnetic means for selectively moving said trigger member to first and second positions thereof corresponding to said first and second angular stop positions, and resilient means for urging said partly-toothed gear to rotate into meshing engagement with said drive gear when said trigger member is moved between its first and second positions.

3. A reversible cassette-type recording and/or reproducing apparatus comprising:
cassette covering means movable between an operative position and an ejecting position;
magnetic head means;
inverting means for effecting inverting movement of said head means between a normal condition and a reverse condition, said inverting means including a turntable shaft, a head support fixed to said turnable shaft and supporting said magnetic head means, an idle gear fixed to said turnable shaft, inverting gear means engaged with said idle gear, a pair of azimuth-adjusting screws for regulating the rotation angle of said magnetic head means on inversion of the latter, and toggle spring means for urging said head support alternatively against one of said azimuth-adjusting screws;
drive means for driving said inverting means;
a first operating member movable in a first direction from an inoperative position to an operative position for effecting movement of said cassette covering means to said ejecting position;
a second operating member movable by said drive means between a first position, corresponding to the normal condition of said head means, and a second position, corresponding to the reverse condition of said head means, in a second direction substantially at a right angle to said first direction; and
cooperatively engageable stopper means on said first and second operating members, respectively, for permitting movement of said first operating member from said inoperative to said operative position when said second operating member is located at said first position, and for preventing said movement of the first operating member to said operative position by mutual engagement of said stopper means when said second operating member is moved to said second position by said drive means in causing an inverting movement of said head means.

4. A reversible cassette-type recording and/or reproducing apparatus according to claim 3; in which said inverting means further includes a rotary arm fixed to said inverting gear means, a changing member movable to act on said rotary arm to cause said magnetic head means to be inverted between said normal and reverse conditions, and a reversing member adapted to be coupled with said second operating member, said changing member being operated through said reversing member when coupled with said second operating member for inversion of said head means to one of said normal condition and said reverse condition.

5. A reversible cassette-type recording and/or reproducing apparatus comprising:
a cassette holder;
a magnetic head;
inverting means operative for inverting said head for a normal condition and a reverse condition;
drive means for operating said inverting means;
ejection means operative for ejecting a tape cassette from an operative position in said holder; and
means for preventing operation of said ejection means unless said inverting means and said drive means are in their conditions corresponding to the normal condition of said head, thereby avoiding damage to the head from unwanted contact therewith when said cassette has been ejected;
said drive means including a drive link coupled to said second operating member for moving the latter, a rotary cam in contact with said drive link to urge the latter to move said second operating member, a partly-toothed gear having a toothed portion and a toothless portion on its circumference and coupled to rotate with rotary cam, a drive gear selectively engageable with the toothed portion of said partly toothed gear, a rotatable member for rotating said drive gear, and selectively actuable trigger means for contacting said drive gear with the toothed portion of said partly toothed gear so that, in response to actuation of said trigger means, said second operating member is moved between its first and second position.

* * * * *